United States Patent [19]

Yokoe et al.

[11] Patent Number: 4,862,856
[45] Date of Patent: Sep. 5, 1989

[54] CONTROL SYSTEM OF EVAPORATED FUEL

[75] Inventors: Kyousuke Yokoe; Masanori Yoshino; Osamu Hokari; Nobuo Date, all of Fujisawa, Japan

[73] Assignee: Isuzu Motors Limited, Tokyo, Japan

[21] Appl. No.: 121,871

[22] Filed: Nov. 17, 1987

[30] Foreign Application Priority Data

Nov. 29, 1986 [JP] Japan ................... 61-283114
Nov. 29, 1986 [JP] Japan ................ 61-182797[U]

[51] Int. Cl.⁴ ............................................. F02M 29/00
[52] U.S. Cl. .................................. 123/519; 137/588; 123/520
[58] Field of Search ............... 123/516, 518, 519, 520, 123/521; 137/588, 543, 17; 251/149.8

[56] References Cited

U.S. PATENT DOCUMENTS

| | | | |
|---|---|---|---|
| 1,052,556 | 2/1913 | Bahan | 251/149.8 |
| 3,683,878 | 8/1972 | Rogers | 123/518 |
| 3,884,204 | 5/1975 | Krautwurst | 123/519 |
| 3,911,950 | 10/1975 | Lowe | 137/543.17 |
| 3,937,250 | 2/1976 | Golan | 137/543.17 |
| 4,526,216 | 7/1985 | Lake | 137/588 |
| 4,659,346 | 4/1987 | Uranashi | 137/588 |
| 4,665,943 | 5/1987 | Meduick | 137/543.17 |
| 4,706,708 | 11/1987 | Fornuto | 137/588 |
| 4,730,652 | 3/1988 | Bartholomew | 137/588 |
| 4,742,809 | 5/1988 | Ito | 123/519 |

FOREIGN PATENT DOCUMENTS

| | | | |
|---|---|---|---|
| 133521 | 9/1979 | Japan | 123/516 |
| 23486 | 2/1980 | Japan | 123/516 |
| 164763 | 12/1980 | Japan | 123/516 |
| 67237 | 5/1986 | Japan | 123/516 |

Primary Examiner—Carl S. Miller
Attorney, Agent, or Firm—Browdy and Neimark

[57] ABSTRACT

In the evaporated fuel control system according to this invention, a plurality of evaporator lines that connect the fuel tank and the engine are provided with two canisters, that is, a first canister installed in the first evaporator line used only during fuel filling and a second canister installed in the second evaporator line. These two canisters are controlled in such a way that the first canister is communicated with the fuel tank only during fuel filling and that only when the vapor fuel can be purged into the engine, the first canister is communicated with the engine. This construction prevents the vapor fuel in the tank from leaking out into the open air when the fuel is supplied into the fuel tank. It also allows the evaporated fuel to be recovered for reuse. This construction also assures safety in the event of an accident or system failure. Furthermore, it is possible to control the first canister in the first evaporator line in such a manner as to minimize deterioration of drivability and exhaust emission.

5 Claims, 12 Drawing Sheets

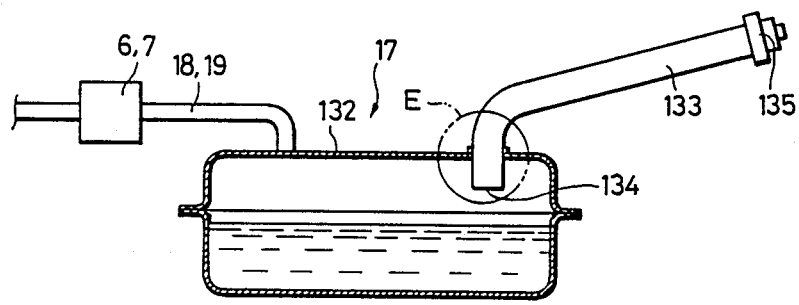
FIG. 11
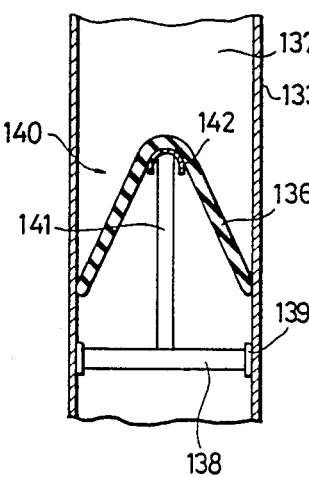 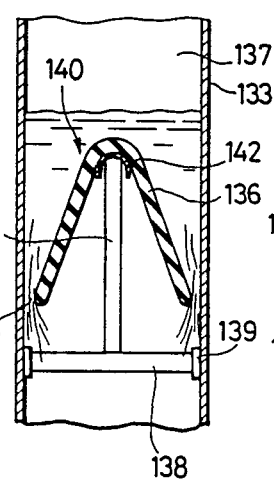 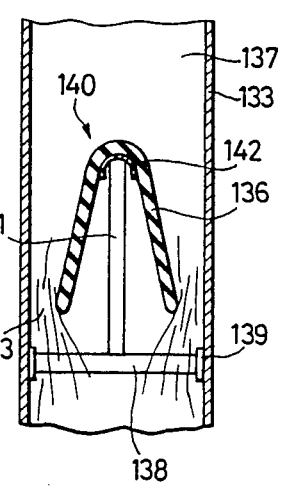
FIG. 12(A)   FIG. 12(B)   FIG. 12(C)

CONTROL SYSTEM OF EVAPORATED FUEL

BACKGROUND OF THE INVENTION

1. Field of the Invention

The present invention relates to an evaporated fuel control system to keep the fuel tank internal pressure within a specified range and thereby prevent the evaporated fuel in the fuel tank from leaking out into the external atmosphere.

2. Description of the Prior Art

The fuel tank conventionally available is shown in FIG. 17. The fuel tank 68 has a filler pipe 67 inserted therein which is bent at 69 to hold the fuel, so that the liquid fuel contained at the bent portion 69 prevents the evaporated fuel in the tank 68 from getting out into the open air. With the structure of the fuel tank 68, however, there is a problem that opening the filler cap when the tank 68 is filled with fuel to its capacity or close to the capacity may result in the fuel flowing out through the filler pipe 67, which is undesirable in the light of safety and environmental pollution.

Generally, the object of the evaporator system is to keep the internal pressure of the fuel tank within a specified range, prevent deformation and damage to the fuel tank and therefore fuel leakage and at the same time to prevent the fuel vapor in the tank from getting out and polluting the environment. To explain in more concrete terms, a part of the fuel in the tank usually evaporates and this raises the internal pressure. But, if the tank is not provided with an evaporator system, this increase in pressure will continue until the fuel tank is deformed and damaged leading to a serious problem such as fuel leakage. Also when the temperature in the fuel tank falls, the internal pressure becomes negative, which may result in deformation of the tank. To prevent such an accident, the fuel tank is required to communicate with the outside air to minimize the internal pressure rise or fall in the tank. But the provision of a vent hole only is not satisfactory and there is a possibility of the tank being filled up to more than the normal capacity during filling because the evaporated fuel in the tank flows out through the vent hole even after the breather is submerged in the fuel. This poses a threat to safety. Furthermore, the evaporated fuel in the tank will continue to be released into the open air until there is no fuel remaining in the tank, polluting the environment to cause public pollution. This is not desirable also from the energy conservation point of view.

To solve these problems, vehicles are equipped with the an evaporator system such as shown in FIGS. 18 and 19. The conventional evaporator system will now be explained by referring to FIGS. 18 and 19. The evaporated fuel in the fuel tank 105 is led to the canister 99 through the evaporator line 108 in which is provided a check valve 109 that opens only when the difference between the pressures before and after the check valve exceeds a specified value. The action of the check valve prevents the unlimited flow of the evaporated fuel from the tank 105 into the canister 99, so that the canister will not become saturated by the larger inflow of the evaporated fuel than it can adsorb, thus preventing the raw gas from dripping from the drain 58. The check valve 109 also has another function. When the filler gun 21 is inserted into the filler pipe 107 after removing the filler cap 106 from the filler pipe 107 and when the inlet of the breather pipe 98 attached to the filler pipe 107 is submerged below the liquid surface, there is no way out for the evaporated fuel in the tank 105 and this makes the fuel loading difficult. In that case, the check valve 109 prevents the excess loading of fuel into the tank. In this way, the check valve 109 controls the amount of vapor passing therethrough and the vapor is further led to the canister 99 where it is adsorbed by the active carbon 59. The canister 99 adsorbs not only the evaporated fuel from the fuel tank 105 but also the evaporated fuel generated in the float bowl 62 of the carburetor 61. When the engine is started, the evaporated fuel adsorbed and held in the canister 99 is introduced through the purge line 63 into the combustion chamber, to be burnt, together with the fresh air drawn in from the drain 58 by the negative pressure generated by suction when the throttle valve 60 is opened. The opening and closing of the purge line 63 is controlled by the diaphragm 65 of the canister 99 which in turn is opened and closed by the negative suction pressure supplied through the vacuum line 64.

As explained above, the evaporator system currently employed in automobiles keeps the evaporated fuel generated in the fuel tank 105 and carburetor 61 from getting out into the atmosphere and also maintains the internal pressure in the fuel tank 105 with in the safe range. In the figures, reference numeral 106 denotes a filler cap. It should be noted, however, that this evaporator system releases the evaporated fuel almost without restriction during fuel filling, as shown by the arrow B. To put it in numerical terms, when gasoline is poured into the tank from the filler gun 21 in the amount equal to a volume V, there is the following relation since the air contained in the tank 105 is kept at the atmospheric pressure: $V = V1 + V2 + V3$, where V1 denotes the evaporated fuel released from the filler pipe 107, V2 represents the vapor fuel released through the breather pipe 98, and V3 represents the vapor fuel released through the evaporator line 108. Since the check valve 109 is provided in the evaporator line 63, V3 is almost zero. That is, V is almost equal to V1+V2. In other words, the amount of gasoline supplied V is almost equal to the vapor fuel V4 released from the fuel injection port. This means that when gasoline is supplied into the tank at a rate of 40 liters per minute, nearly 40 liters of gasoline will find its way out into the open atmosphere every minute. This will present a serious problem when a restriction on the vapor fuel discharge during fuel filling is legislated. The evaporator systems used on the current automotive vehicles are fundamentally the same although there are small variations in the structure of the check valve 109 and canister 99, and they all have the above-mentioned problems.

The Japanese Patent Laid-Open No. 164763/1980 is cited as an example of an evaporated fuel discharge prevention device for the internal combustion engines of automobiles. We will explain about this device by referring to FIG. 20. FIG. 20 shows the evaporated fuel discharge prevention device for internal combustion engines of automobiles which is installed in a passage through which the evaporated fuel is discharged into the open air. The vapor fuel discharge prevention device has a canister 71 containing the adsorbent 72 by which the vapor fuel introduced from the vapor fuel inlet port is temporarily adsorbed while it is moving toward the open air communication port 73. When the internal combustion engine is run, the adsorbent 72 is cleaned by fresh air introduced from the open air communication port 73 and the vapor fuel removed from the adsorbent 72 is discharged from the canister 71 through the vapor fuel discharge port into the engine.

The device also has another canister 80 which contains adsorbent 87 and which is divided in two by a separator 84 except at the bottom. Formed at the upper part of one divided part of the canister 80 are a vapor fuel inlet port 85 and a vapor fuel discharge port 86. At the upper part of the other divided part of the canister 80 is formed an open air communication port 82. The vapor fuel inlet port 85 is connected to the upper part of the paper separator 88 by a pipe 78 through a solenoid valve 77. The pipe 78 is greater in inner diameter than the pipe 89 which connects the paper separator 88 and the canister 71. A suction pump 83 is connected to the open air communication port 82 through a three-way solenoid valve 79 which is connected at one end to the deadsorbing air inlet pipe 81. A solenoid valve 77 is operated according to the open-closed state of the cap 76 on the fuel injection port 75 in such a way as to open the pipe 78 when the cap 76 is removed. The three-way solenoid valve 79 also is operated according to the state of the cap 76 on the fuel injection port 75 in such a way as to communicate the open air communication port 82 of the canister 80 with the deadsorbing air inlet pipe 81 when the cap 76 is on the fuel injection port 75 and to communicate the open air communication port 82 with the suction pump 83 when the cap 76 is removed and the fuel injection port 75 is open. It should be noted, however, that the above evaporated fuel discharge prevention device has no purge control valve in the purge line, so that the purge line is open at all times degrading the exhaust gas. Furthermore, the device has no control valve for checking the full-tank level, so that the full-tank level is not clearly identified, which is dangerous. The further disadvantages of the device are that the structure of the device is complex and costly and that the negative pressure generating device is not sufficiently durable.

Still another example of the evaporated fuel discharge prevention device is disclosed in the Japanese Utility Model Laid-Open No. 67237/1986. This device is explained by referring to FIG. 21. The device has a valve mechanism installed in the fuel injection portion 90 of the fuel tank. The valve mechanism, when the fuel supply nozzle is inserted and hermetically sealed into the fuel injection portion 90, communicates the fuel tank with the active carbon canister for vapor fuel adsorption through the vapor passages 93, 94. The vapor fuel is recovered from the active carbon canister into the suction manifold. In more detail, the evaporated fuel discharge prevention device has the fuel injection portion 90 divided into a valve chamber 91 and a fuel supply nozzle insertion passage 92. The valve chamber 91 has one end of a vapor fuel passage 93 inserted therein. The valve mechanism consists of a valve element 96 urged by the spring 95 to partly project into the insertion passage 92; and a valve disc 97 which is linked with the valve element 96 and adapted to close the inlet port of the vapor fuel passage 93 that opens into the valve chamber 91. The above evaporated fuel discharge prevention device, however, has no purge control valve in the purge line, which means that the purge line is always open degrading the quality of the exhaust gas. This also presents a risk of compounding the situation in the event of an accident. The device also has a problem with respect to the durability and reliability of the filler seal.

An air cleaner for automotive engine is disclosed in the Japanese Utility Model Laid-Open No. 23486/1980. This is briefly explained by referring to FIG. 22. In the air cleaner 100 installed in the air suction system of the engine, a cleaner element 103 divides the air cleaner 100 into the dust side on the side of the air intake port 101 and the clean side on the side of the carburetor. On the clean side of the cleaner element is formed a layer of adsorbing material 102 to which the vapor fuel in the fuel tank 104 is introduced.

The automotive fuel tank disclosed by the Japanese Utility Model Laid-Open No. 23486/1980 has a fuel passage formed in the fuel filling pipe which, however, is not capable of preventing the vapor fuel from flowing out to the external environment. The evaporated fuel discharge prevention device incorporated in the gasoline tank supply port for the automobiles disclosed by the Japanese Utility Model Laid-Open No. 133521/1979 has a vapor discharge prevention cover which, however, is not good enough as a sealing structure and may not be able to seal the vapor depending on the shape of the filler gun.

SUMMARY OF THE INVENTION

The primary object of the present invention is to overcome the above-mentioned drawbacks and to provide an evaporated fuel control system which consists of: a sealing means or a check valve such as one-way valve provided in the filler gun insertion portion at the neck of the filler pipe in order to prevent the vapor fuel in the fuel tank from getting out into the open air through the fuel injection port or filler port of the filler pipe during fuel filling; and an evaporator line used only during fuel filling which takes the part of the conventional breather, the evaporator line being adapted to temporarily hold and adsorb in the canister the vapor fuel dispelled from the fuel tank by the incoming fuel; whereby the evaporator line is controlled in such a manner that it communicates with the fuel tank only during the fuel filling and with the carburetor only when the purge operation can be performed, and that it is fully closed at other times, thereby preventing the release into the open air of the vapor fuel during the fuel filling and also securing safety in the event of accidents or system failures.

Another object of this invention is to provide an evaporated fuel control system which has a canister for adsorbing the vapor fuel generated in the fuel tank and which makes the canister communicate with the fuel tank during the fuel filling and, when the purge operation can be done, connects the canister to the carburetor.

A further object of this invention is to provide an evaporated fuel control system in which the canister is communicated with an open air when activated and is also communicated through each evaporator line with the fuel tank, the carburetor and the open air, and in which each evaporator line is provided with a solenoid valve.

A further object of this invention is to provide an evaporated fuel control system in which the opening and closing of the above solenoid valves is controlled in response to the operating condition of the engine, ignition switch, filler switch, gear position sensor, vehicle speed sensor, clutch pedal switch and suction pressure sensor to ensure smooth and reliable operation of the fuel filling and the vapor fuel purging.

Another object of this invention is to provide an evaporated fuel control system which uses an evaporator line in place of the conventional breather to temporarily hold and adsorb in the canister the vapor fuel dispelled from the fuel tank by the incoming fuel and then use the recovered vapor fuel for combustion, so that this system can prevent the vapor fuel from flowing out into the open air during fuel loading and thus prevent the air pollution, making this system advantageous in the light of the energy conservation and environmental pollution.

A further object of this invention is to provide an evaporated fuel control system for preventing the vapor fuel from flowing out into the open air in which the above sealing means consists of a check valve and is adapted to open and close in response to the condition of the fuel filling operation, so that the function of sealing the filler portion of the fuel tank can be achieved with a very simple sealing structure.

A still further object of this invention is to provide an evaporated fuel control system in which the above canister accommodates a ring-shaped case containing adsorbent or has adsorbent diagonally arranged therein, thus making the resistance of the system very small.

A further object of this invention is to provide an evaporated fuel control system in which a rollover valve is provided in the evaporator line in the fuel tank so as to secure safety in the event of car accident or system failure.

A further object of this invention is to provide an evaporated fuel control system which can prevent the vapor fuel from escaping out into the open air not only in normal conditions but also during fuel filling when the filler gun is inserted into the filler pipe of the fuel tank and thereby contain the vapor fuel in the tank; which can easily be mounted to any part of the filler pipe or to the outlet portion of the filler pipe; which can hermetically seal the filler pipe with the minimum resistance; and which, when so required, can perform the full-tank fuel level check to prevent an accident that fuel blows out when the filler cap is opened.

Still another object of this invention is to provide a vapor fuel control system which employs a check valve as the sealing means at the filler portion of the filler pipe in the fuel tank to prevent the vapor fuel from flowing out of the filler portion into the open air and more specifically to prevent the vapor fuel or liquid fuel from blowing out into the open air from the tank when the filler cap is opened to insert the filler gun into the filler portion of the tank during the fuel filling, thereby increasing the level of safety; and which can hermetically seal the filler portion with the minimum resistance.

A still further object of this invention is to provide an evaporated fuel control system which can be installed anywhere on the filler portion when the above check valve is made of resilient material such as rubber which opens the passage in response to the fuel flow.

Still another object of this invention is to provide an evaporated fuel control system which can not only be installed anywhere on the filler portion bu also perform the full-tank fuel level check when the above check valve is formed of a float type sealing member that closes the passage in the filler portion by the action of the spring.

A further object of this invention is to provide an evaporated fuel control system which can be formed in a simple structure with a small number of parts when the above sealing member is installed in the enlarged diameter portion of the filler pipe and is urged by the spring toward the upstream of the filler pipe.

Still another object of this invention is to provide an evaporated fuel control system in which the above sealing member consists of a leaf spring that has its one end secured to a bracket mounted to the filler portion; in which, when the above leaf spring or sealing member is in contact with the downstream end of the filler portion to close the passage and the filler portions opens to the lower part of the fuel tank, the fuel can be supplied into the tank during the fuel filling because the passage is opened by the head difference; in which during fuel filling the vapor fuel in the fuel tank cannot escape into the open air because the fuel injection port of the filler portion is filled with liquid fuel; and in which, when the filler cap is opened with the tank almost filled to the capacity, no sudden pressure change will occur because the leaf spring closes the fuel injection port of the filler portion and therefore the fuel will not blow out from the filler portion.

A still further object of this invention is to provide an evaporated fuel control system which, as shown in the drawings, has a simple structure made up of a small number of parts, so that the system failure rarely occurs and the maintenance can be done with ease.

BRIEF DESCRIPTION OF THE DRAWINGS

FIG. 11 is a cross section showing the fuel tank equipped with a filler portion sealing structure applied to the evaporated fuel control system of this invention;

FIGS. 12(A), 12(B) and 12(C) are cross sections showing one embodiment of the filler portion sealing structure in the fuel tank applied to the evaporated fuel control system of this invention;

DETAILED DESCRIPTION OF THE EMBODIMENT

Figure 1:
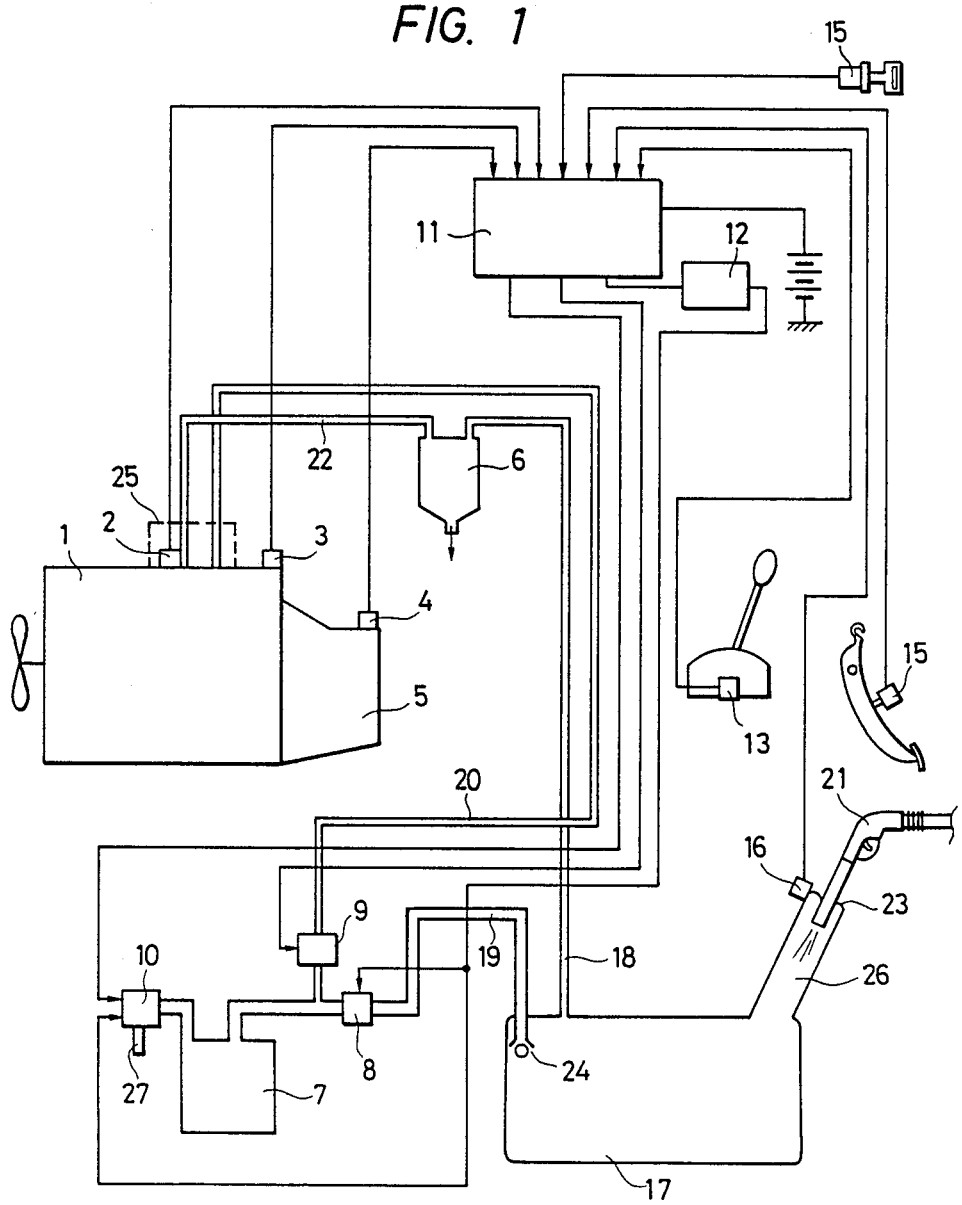
FIG. 1 is a schematic diagram showing one embodiment of the evaporated fuel control system according to this invention.

Now, by referring to the attached drawings, we will explain the embodiments of the evaporated fuel control system according to this invention. FIG. 1 shows the evaporated fuel control system of this invention. The power of the engine 1 mounted in the vehicle is extracted through a transmission 5. The carburetor 25 that sends the intake fuel mixture to the engine 1 is provided with a suction pressure sensor 2. The engine 1 also has a revolution sensor 3 to detect the revolution per minute of the engine 1. The transmission 5 is provided with a vehicle speed sensor 4 that detects the speed of the vehicle. A gear position sensor 13 is installed in the shift lever section. A clutch pedal switch 14 is provided to the clutch. (This is not provided in cars with automatic transmission.) A filler switch 16 is provided to the filler pipe 26 of the fuel tank 17 to detect when the filler gun 21 is inserted into the filler pipe 26 or when the filler cap is removed during the fuel filling. The electronic controller 11 receives signals from the ignition switch 15, suction pressure sensor 2, revolution sensor 3, vehicle speed sensor 4, gear position sensor 13, clutch pedal switch 14 and filler switch 16. From ignition switch 15 either ON or OFF signal is fed to the electronic controller 11. The suction pressure sensor 2 detects whether the carburetor suction pressure or throttle chamber suction pressure is below, say, −50 mmHg. The revolution sensor 3 identifies whether or not the revolution speed of the engine is, for instance, zero. The vehicle speed sensor 4 checks whether the vehicle velocity is higher than, say, 50 km/h. The gear position sensor 13 checks whether the gear is in the fourth or fifth speed position. The clutch pedal switch 14 checks whether the clutch pedal is depressed or not. The filler switch 16 checks whether the filler cap or filler lid is open or closed. Upon receiving this information, the electronic controller 11 decides whether the car is being supplied with fuel or it is possible to perform the purge operation or otherwise. According to the above decision, the electronic controller 11 sends an open or close signal to the solenoid valve 8 in the evaporator line 19 that leads to the canister 7, the solenoid valve 9 in the evaporator line 20, and to the solenoid valve 10 in the line 27 that leads to the external atmosphere. One end of the evaporator line 19 is communicated to the fuel tank 17 through the rollover valve 24; the other end is communicated to the canister 7 through the solenoid valve 8. The evaporator line 20 is communicated at one end with the carburetor 25 and at the other with the canister 7 through the solenoid valve 9. In the figure, reference numeral 6 represents a conventional canister, 18 and 22 conventional evaporator lines, and 23 a check valve which is a sealing means provided in the filler pipe 26.

Figure 2:
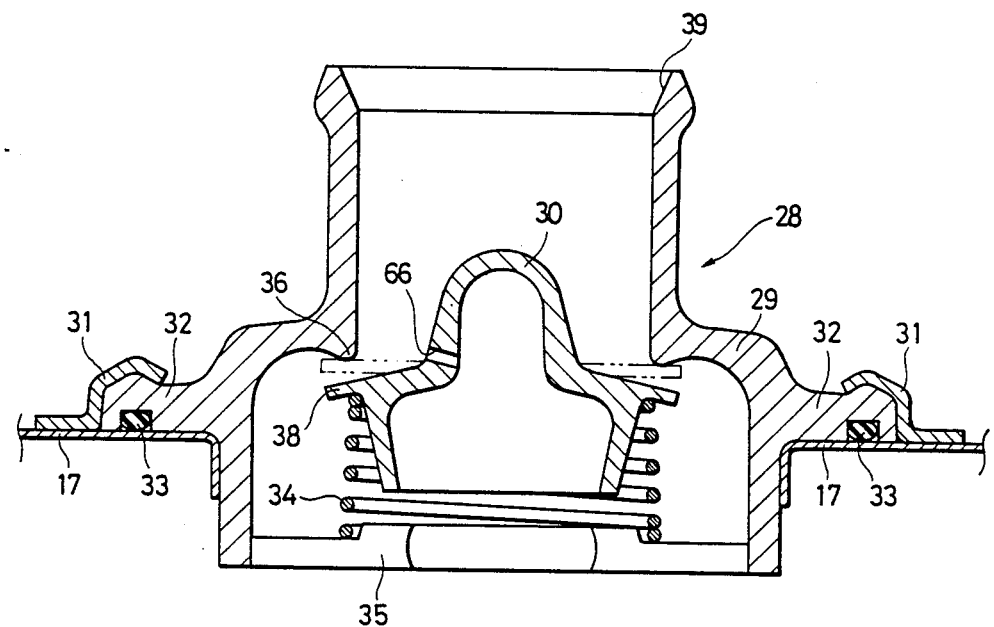
FIG. 2 is a cross section showing the sealing means in the filler pipe of the fuel tank.

FIG. 2 shows one example of the sealing means provided to the fuel injection portion or the filler portion of the fuel tank 17. This sealing means is a one-way valve 30 or check valve 28 consisting of a filler pipe 29 and a valve installed in the filler pipe 29. The filler pipe 29 is formed with a flange 32 which is hermetically secured to the filler portion or neck of the fuel tank 17 by a fixing means 31 such as caulking. On the inner surface of the filler pipe 29 is formed a valve seat 36. At the fuel injection port of the fuel tank 17, a support 35 for spring 34 is rigidly secured. A spring 34 is interposed between the support 35 and the valve 30 so that the valve 30 is pushed upward to keep the sealing surface 38 of the valve 30 in sealing contact with the valve seat 36 under normal condition. The valve 30 is formed with a small hole 66 to let the residual fuel remaining in the filer pipe 29 drip into the fuel tank 17. The position of the valve 30 shown with a solid line represents the open state where the fuel is supplied into the tank. The position indicated by the broken line represents the closed state. Normally, the valve is tightly closed and when the fuel is to be injected, the pressure of the incoming fuel pushes down the valve 30 to open it. If fuel remains at the neck of the filler pipe 29, the residual fuel is not affected by the pressure of the evaporated fuel. So, when the filler cap is opened with the tank filled almost to the capacity, there is no danger of the fuel being blown out of the filler pipe. This structure assures safety and prevents environmental pollution.

Figure 3:
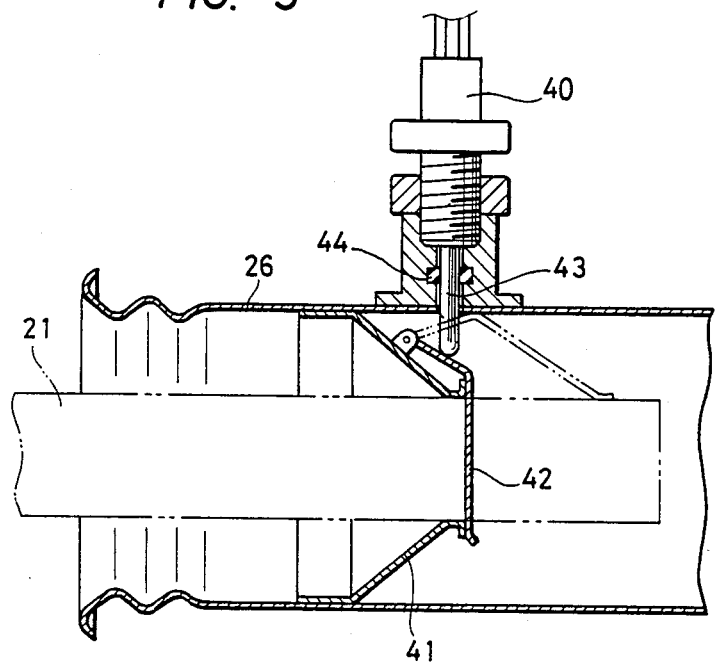
FIG. 3 is a cross section showing the filler switch in the filler pipe of the fuel tank.

FIG. 3 shows one example of the filler switch 16 provided to the filler pipe 26 of the fuel tank 17. Rigidly secured to the inner surface of the filler pipe 26 is a valve seat 41 to which a valve 42 is oscillatably attached. A switch 40 is mounted on the outside of the filler pipe 26. The switch 40 has a retractable rod 43 urged by the spring to project from the switch 40. In this structure, as the filler gun 21 is inserted into the filler pipe 26 to inject fuel into the fuel tank, the filler gun 21 pushes up the valve 42 as shown by the broken line and the valve 42 pushes the rod 43 into the switch 40. The rod 43 pushed in turns on the switch 40.

Figure 4:
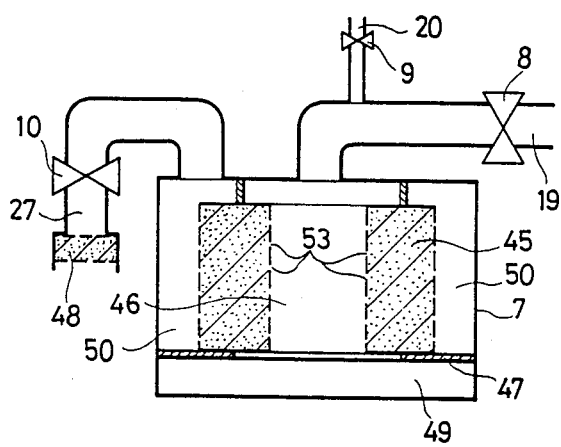
FIG. 4 is a cross section showing one example of the canister used in the evaporated fuel control system of this invention.
Figure 6:
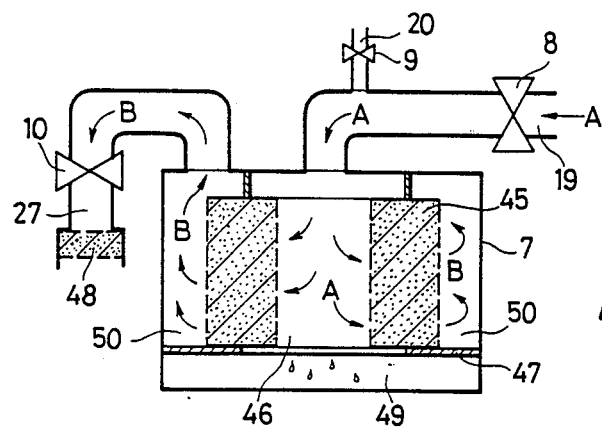
FIG. 6 and FIG. 7 are cross sections showing the operation of the canister of FIG. 4.
Figure 7:
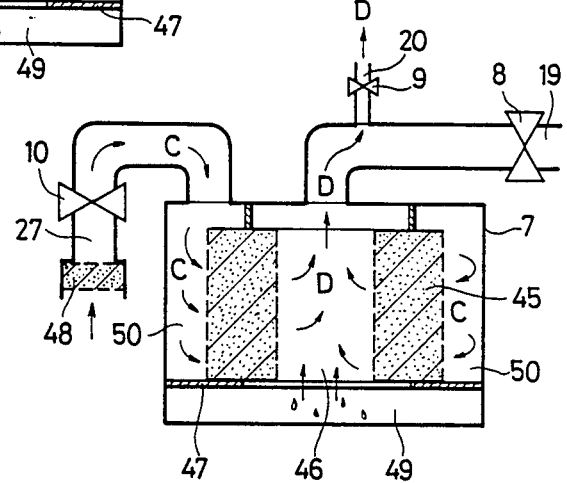

FIGS. 4, 6 and 7 show one example of the canister applied to the evaporated fuel control system of this invention. This canister 7 is of a low resistance type. Inside the canister 7 is rigidly secured a ring support plate 47 which divides the canister interior into the vapor fuel chamber and the liquid fuel collection chamber 49. On the ring support plate 47 is placed an annular case 45 containing active carbon which partitions the vapor fuel chamber into an inner passage 46 and an outer passage 50. It is, of course, possible to directly form the active carbon into the annular shape instead of putting active carbon in the annular case 45.

Figure 5:
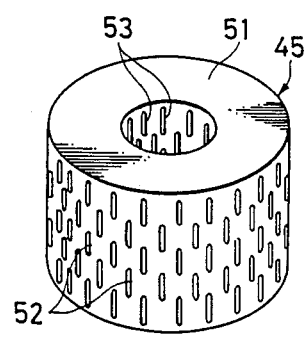
FIG. 5 is a perspective view showing the annular case disposed in the canister of FIG. 4.

FIG. 5 shows the perspective view of the annular case 45. The inner and outer cylinders have many holes 53 and 52 respectively. Communicated to the inner passage 46 are the evaporator line 19 which leads to the fuel tank through the solenoid valve 8 and the evaporator line 20 that leads to the engine through the solenoid valve 9. The outer passage 50 is open to the external air through the solenoid valve 10 and filler 48. The solenoid valve 8 is open only when the fuel is injected. When the solenoid valve 8 is open, the vapor fuel flows in the direction of arrow A of FIG. 6 and passes through the active carbon in the annular case 45 where it is removed of gasoline component. The clean gas is now led in the direction of arrow B of FIG. 6 and passes through the solenoid valve 10 and filter 48 before being discharged into the open air. The solenoid valve 9 opens only when the purge operation is performed. When the solenoid valve 9 is open, the external air flows in as shown by the arrow C of FIG. 7 passing through the active carbon in the annular case 45 into the inner passage 46. Then the air mixes with the vapor fuel generated in the liquid fuel collection chamber 49 and flows through the solenoid valve 9 into the evaporator line 20 as shown by the arrow D of FIG. 7.

Figure 8:
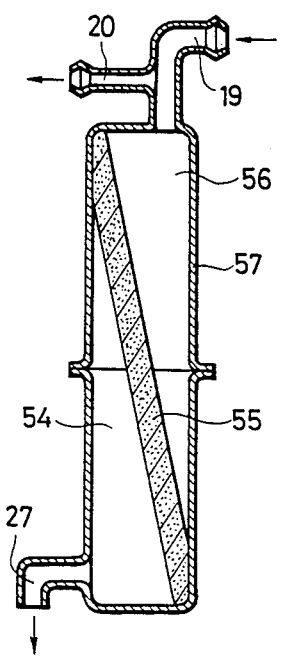
FIG. 8 is a cross section showing another canister used in the evaporated fuel control system of this invention.

FIG. 8 shows another example of the canister. This canister 57 is of low resistance type. To reduce the gas flow resistance, the canister 57 has an increased area through which the vapor fuel passes. That is, a case 55 containing active carbon is diagonally installed in the casing of the canister 57 to divide the interior of the casing into a vapor fuel chamber 56 and a clean gas chamber 54. As with the preceding example, it is also possible to directly form the active carbon into a plate shape. The passage 19 is an evaporator line leading to the fuel tank and the passage 20 is another evaporator line leading to the engine. The passage 27 is a line leading to the open air.

Next, we will explain the embodiment of the sealing structure for the filler portion of the fuel tank 17 applied to the evaporated fuel control system of this invention.

FIG. 11 shows one example of the automotive fuel tank 17 equipped with the filler portion sealing structure applied to the evaporated fuel control system of this invention. The fuel tank 17 has a filler pipe 133 connected to the tank's filler portion at the top 132. The fuel injection port 134 at the neck of the filler pipe 133 opens into the fuel tank 17. The filler pipe 133 is normally attached with a filler cap 135 to close the filler pipe 33. The evaporator lines 18, 19 connected to the top of the fuel tank 17 are vapor fuel passages communicating with the canisters 6, 7 that recover the vapor fuel.

FIGS. 12(A), 12(B) and 12(C) show the check valve in the filler pipe 133 which is installed in the region indicated by E of FIG. 11. The check valve 140 consists of an umbrella-shaped rubber valve 136 which may be installed at an appropriate position in the filler pipe 133, for instance, at near the fuel injection port 134 at the neck of the filler pipe 133 (see FIG. 11). The cross bar 138 extends diametrically with respect to the ring 139 secured to the filler pipe 133 and is fixed to the ring 139. Secured to the cross bar 138 is a support rod 141 with a valve retainer fixture 142 at the top. The rubber valve 136 is mounted on the valve retainer fixture 142. As shown in FIG. 11, when the filler cap 135 is attached to the filler pipe 133 or in normal condition, the passage 137 in the filler pipe 133 is closed by the check valve 140 as shown in FIG. 12(A). As the filler cap 135 is removed from the filler pipe 133 to supply the fuel into the tank 17, the filler gun is inserted into the filler pipe 133 and the fuel is injected from the filler gun, the rubber valve 136 begins to deflect as shown in FIG. 12(B) to form a gap 147 between the rubber valve 136 and the filler pipe 133 thus opening the passage 137. As the fuel is further supplied into the filler pipe 133, the rubber valve 136 deflects further forming a sufficiently large gap 143 between the rubber valve 136 and the filler pipe 133 fully opening the passage 137. As a result the fuel from the filler gun is smoothly supplied into the tank. When the filler gun stops supplying the fuel, the passage 137 is immediately closed as shown in FIG. 12(A), so that the vapor fuel cannot be released into the external environment through the filler pipe 133.

Figure 13A:
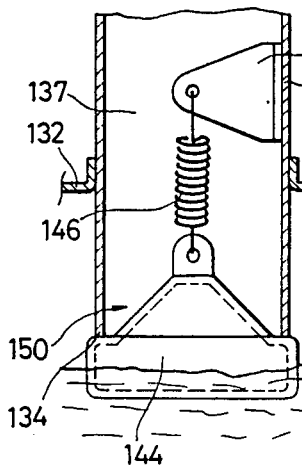
FIGS. 13(A), 13(B) and 13(C) are cross sections showing another embodiment of the filler portion sealing structure in the fuel tank applied to the evaporated fuel control system of this invention.
Figure 13B:
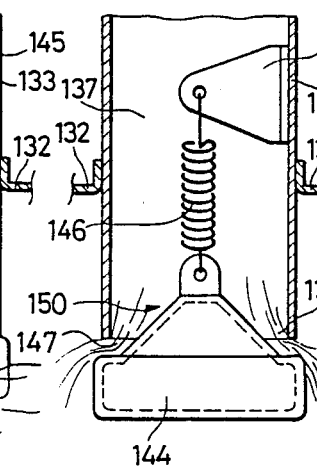
Figure 13C:
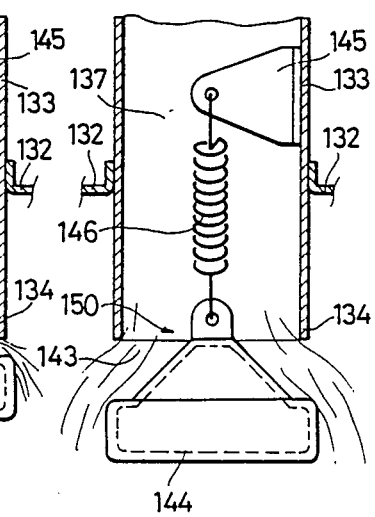

FIGS. 13(A), 13(B) and 13(C) show another embodiment of the check valve installed in the filler pipe 133 in the region marked by E of FIG. 11. The check valve 150 consists of a float valve 144 installed at the fuel injection port 134 at the neck of the filler pipe 133. Firmly secured close to the fuel injection port 134 is a bracket 145 to which one end of a spring 146 is attached. The other end of the spring 146 is attached to the float valve 144. As shown in FIG. 11, when the filler cap 135 is on the filler pipe 133, i.e., in normal condition, the check valve 150 closes the passage 137 of the filler pipe 133. When the filler cap 135 is removed to supply the fuel into the tank 17, the filler gun is inserted into the filler pipe 133 and the fuel begins to be injected from the filler gun, the spring 146 begins to be elongated as shown in FIG. 13(B), forming a gap 147 between the float valve 144 and the filler pipe 133 opening the passage 137. As more fuel is supplied into the filler pipe 133, the spring 146 extends sufficiently long, as shown in FIG. 13(C), to make the gap 143 large enough and the passage 137 fully open so that the fuel can smoothly be supplied through the filler pipe. When the fuel supply from the filler gun is stopped, the passage 137 immediately is closed, as shown in FIG. 13(A), so that the vapor fuel cannot be released into the open air through the filler pipe 133.

Figure 14A:
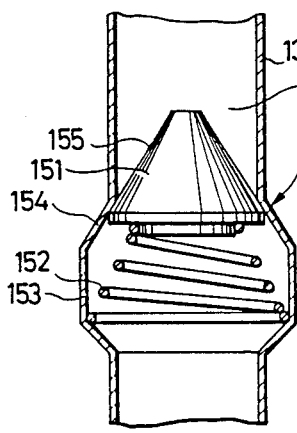
FIGS. 14(A), 14(B) and 14(C) are cross sections showing still another embodiment of the filler portion sealing structure in the fuel tank applied to the evaporated fuel control system of this invention.
Figure 14B:
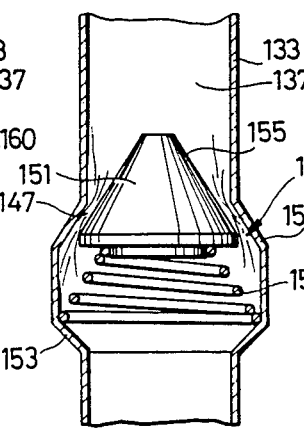
Figure 14C:
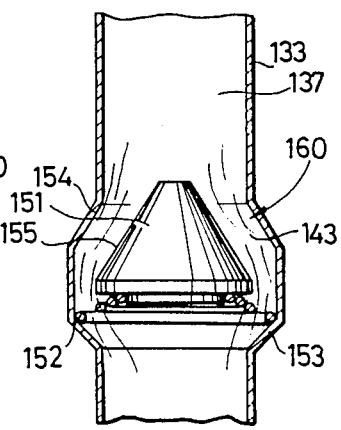

FIGS. 14(A), 14(B) and 14(C) show still another embodiment of the check valve installed in the filler pipe 133 in the region marked by E of FIG. 11. The check valve 160 consists of a valve member 151 and may be installed near the fuel injection port 134 at the neck of the filler pipe (see FIG. 11). The valve member 151 has a conical surface 155. Near the fuel injection port 134, the filler pipe 133 is formed into an expanded diameter portion 153. The expanded diameter portion 153 has a tapered surface 154 with which the conical surface 155 of the valve member 151 is brought into contact to hermetically close the passage 137. Also the expanded diameter portion 153 has a spring 152 contained therein. One end of the spring 152 is engaged with the underside of the valve member 151 and the other end of the spring 152 is supported on the expanded diameter portion 153 of the filler pipe 133. In other words, the expanded diameter portion 153 of the filler pipe 133 offers a base to support the spring 152 and the seat with which the valve member 151 engages.

When, as shown in FIG. 11, the filler cap 135 is on the filler pipe 133, i.e., under the normal condition, the check valve 160 closes the passage 137 of the filler pipe 133 as shown in FIG. 14(A). When the filler cap 135 is removed from the filler pipe 133 to supply fuel into the tank 17, the filler gun is inserted into the filler pipe 133 and the fuel is injected from the filler gun, the spring 152 starts to be compressed as shown in FIG. 14(B) with the result that the a gap 147 begins to be formed between the conical surface 155 of the valve member 151 and the tapered surface 154 of the filler pipe 133, opening the passage 137. As more fuel is injected into the filler pipe 133, the spring 152 is further compressed making the gap between the tapered surface 154 of the filler pipe 133 and the conical surface 155 of the valve member 151 sufficiently large and the passage 137 fully open, so that the fuel is smoothly supplied into the tank. When the fuel injection from the filler gun is stopped, the passage 137 is immediately closed as shown in FIG.

14(A). So the vapor fuel cannot be released into the open air through the filler pipe 133.

Figure 15:
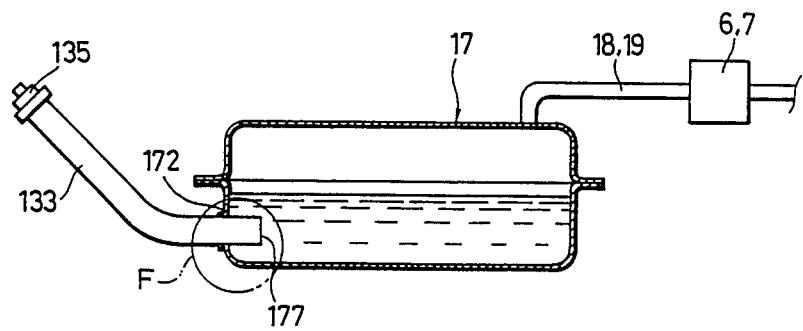
FIG. 15 is a cross section showing another example of the fuel tank equipped with a filler portion sealing structure applied to the evaporated fuel control system of this invention.

FIG. 15 shows another example of the automotive fuel tank 17 equipped with the filler portion sealing structure applied to the evaporated fuel control system of this invention. Connected to the side portion 172 of the fuel tank 17 is a filler pipe 133 which has its fuel injection port 177 inserted into the fuel tank 17. The filler pipe 133 normally is fitted with a filler cap 135. The pipes 18, 19 attached to top of the fuel tank 17 are the evaporated vapor fuel passages leading to the canisters 6, 7 that recover the vapor fuel.

Figure 16A:
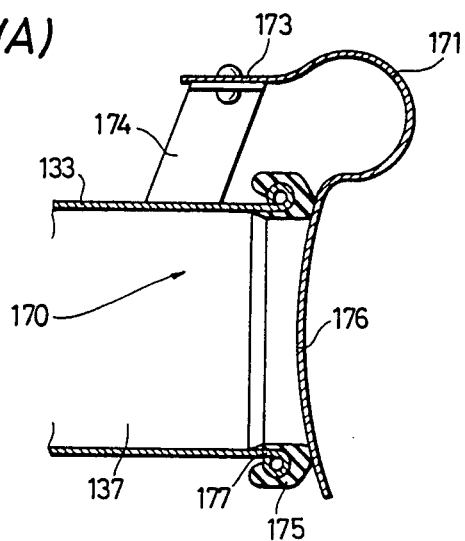
FIGS. 16(A) and 16(B) are cross sections showing another embodiment of the filler portion sealing structure in the fuel tank of FIG. 15.
Figure 16B:
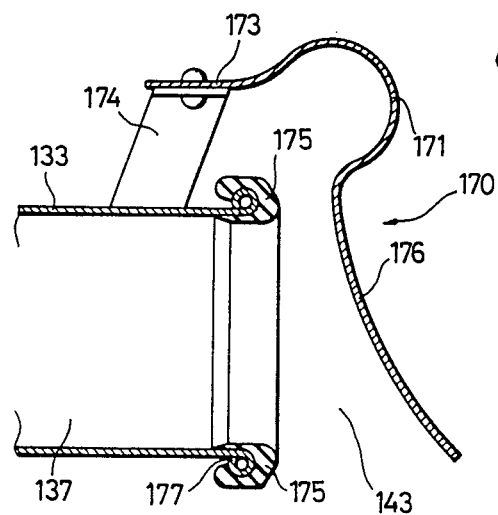
Figure 17:
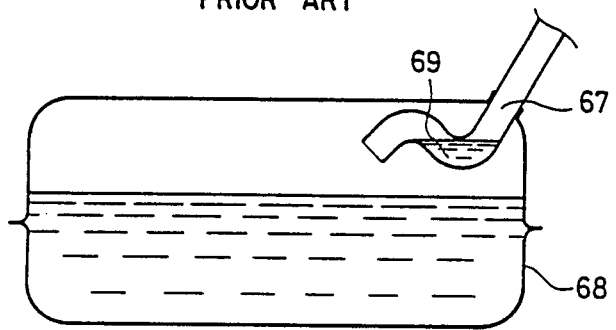
FIG. 17 is a schematic view showing a conventional fuel tank and filler pipe.
Figure 19:
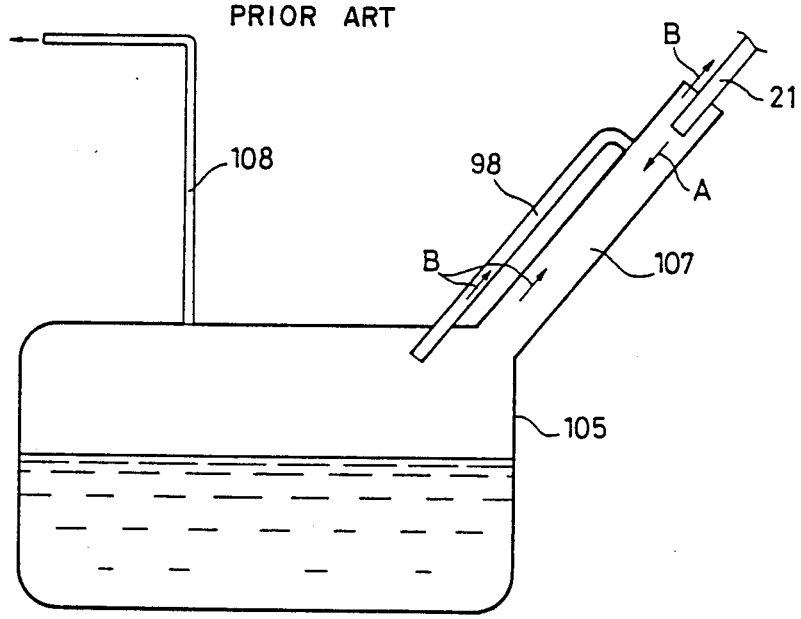
FIG. 19 is a schematic view showing the fuel tank of FIG. 18.
Figure 18:
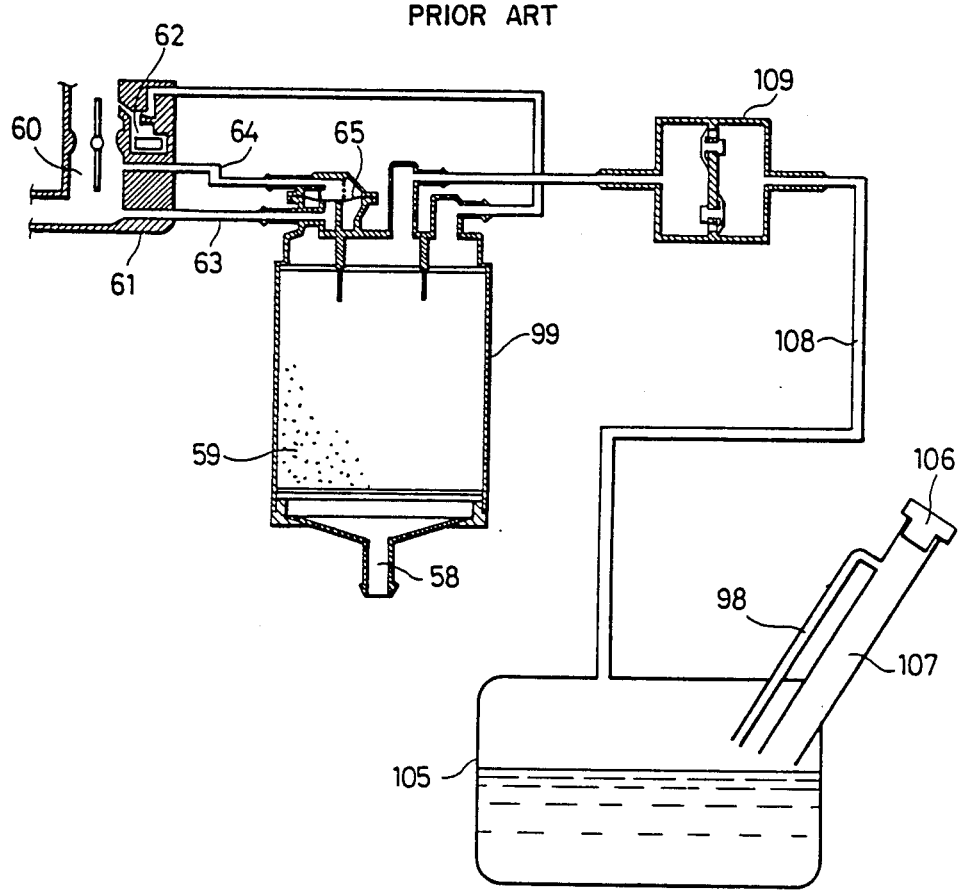
FIG. 18 is a schematic view showing a conventional evaporator system.
Figure 20:
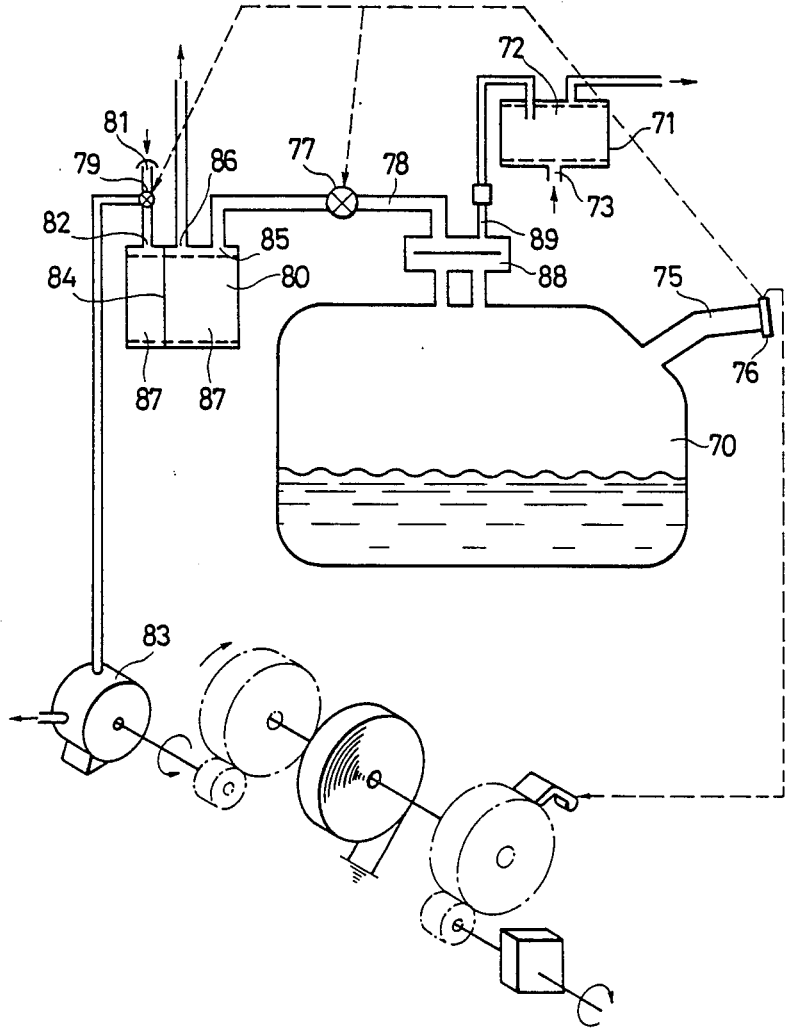
FIG. 20 is a schematic diagram showing a conventional evaporated fuel discharge prevention device.
Figure 21:
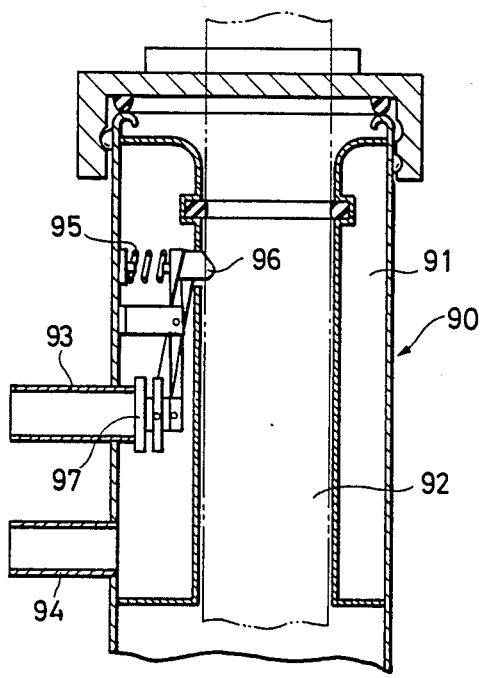
FIG. 21 is a schematic diagram showing another conventional evaporated fuel discharge prevention device.
Figure 22:
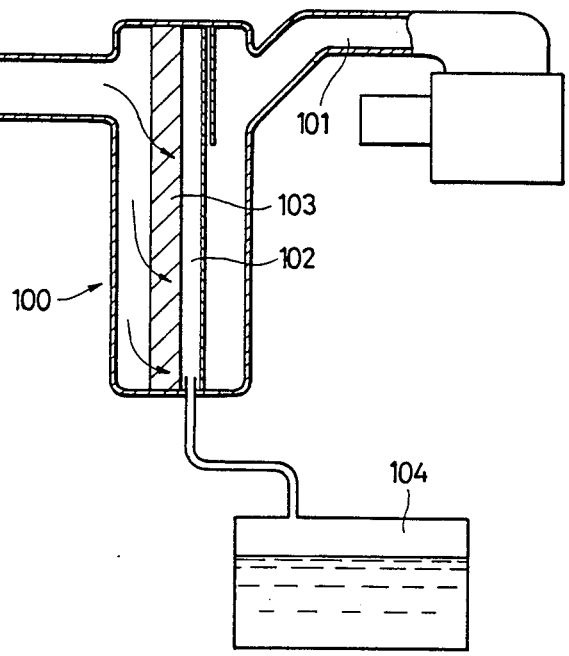
FIG. 22 is a schematic diagram showing a conventional air cleaner device for automotive engines.

FIGS. 16(A) and 16(B) show one embodiment of the check valve installed in the filler pipe 133 in the region marked by F in FIG. 15. The check valve 170 consists of a spring member 171 and a valve member 176 formed integral with the spring member 171 and is installed in the fuel injection port 177 at the neck of the filler pipe 133 (see FIG. 15). Secured to the filler pipe 133 near the fuel injection port 177 is a bracket 174 which has one end 173 of the spring member 171 attached thereto. Fitted to the fuel injection port 177 of the filler pipe 133 is a sealing member 175 against which the valve member 176 is pressed. When, as shown in FIG. 15, the filler cap 135 is on the filler pipe 133, i.e., under the normal condition, the passage 137 of the filler pipe 133 is closed by the check valve 170 as shown in FIG. 16(A). When the filler cap 135 is removed from the filler pipe 133 to supply fuel into the tank 17, the filler gun is inserted into the filler pipe 133 and the fuel is injected from the filler gun, the spring member 171 is deflected as shown in FIG. 16(B), causing the valve member 176 to part from the sealing member 175 with the result that a gap 143 is formed between the valve member 176 and the sealing member 175 on the fuel injection port 177 of the filler pipe 133. Now, the fuel from the filler gun is injected through the opened passage 137. When the fuel supply from the filler gun is stopped, the passage 137 is immediately closed as shown in FIG. 16(A). Since the filler pipe 133 is connected to the side portion 172 of the fuel tank 17 and the valve member 176 is pressed against the sealing member 175 of the filler pipe 133 by the spring member 171, the vapor fuel in the tank 17 cannot flow out into the outer air through the filler pipe 133 during fuel filling. Also when the filler cap 137 is removed with the fuel tank 17 filled to near its capacity, the fuel will not blow out from the filler pipe 133 because the filler pipe 133 is closed by the valve member 176 so that the pressure inside the fuel tank 17 will not be rapidly transferred to the filler pipe 133.

In the foregoing we have described several embodiments of the filler portion sealing structure for the fuel tank applied to the evaporated fuel control system of this invention. It should be noted that the filler portion sealing structure of this invention is not limited to the above embodiments alone. For example, the filler pipe where the check valve is installed do not have to be cylindrical but may be formed as a square hollow column. In that case, the check valve need only be changed in shape according to the filler pipe configuration. As to the installation position of the check valve, the check valve can be installed at an optimum location in the filler pipe according to the structure of the check valve. And the check valve may be given various modifications in shape as long as the changed structure can prevent the vapor fuel from being released into the outer atmosphere from the filler pipe and can be opened by the weight of the fuel.

Figure 9:
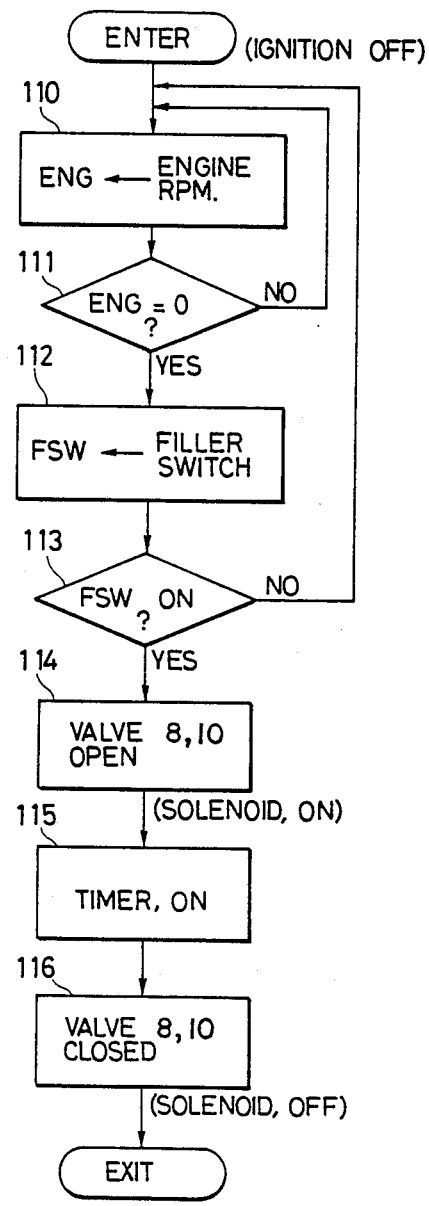
FIG. 9 and FIG. 10 are flowcharts showing the sequence of operation for the evaporated fuel control system of this invention.
Figure 10:
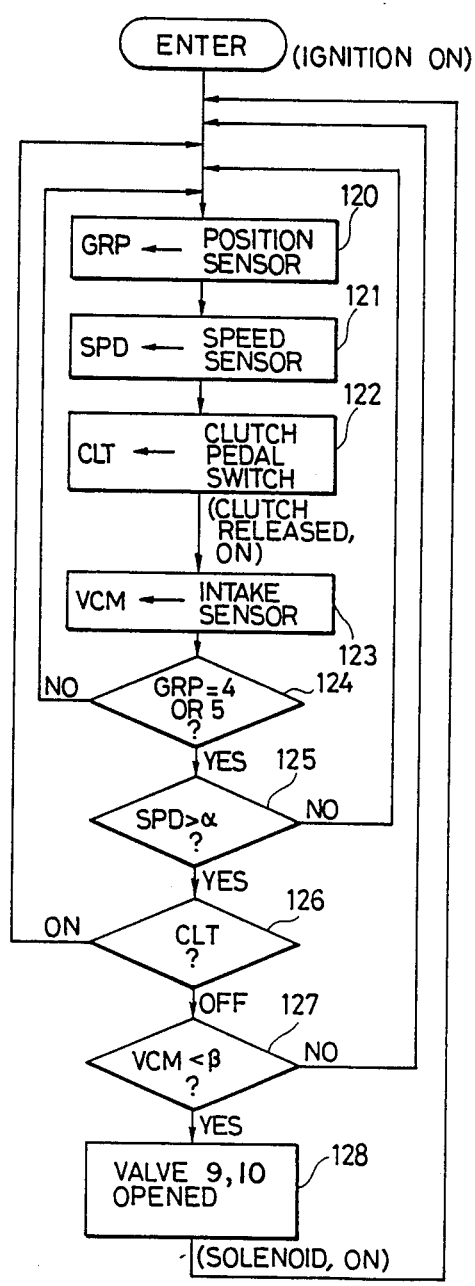

Now, by referring to the evaporator system of FIG. 1 and the flowcharts of FIGS. 9 and 10, we will explain the operation of the evaporator system or the evaporated fuel control system of this invention and particularly the open-close operation of the solenoid valves 8, 9, 10.

In the flowcharts, ENG stands for the number of revolutions per minute of the engine 1, FSW for the state of the filler switch, GRP for the gear position, SPD for the vehicle speed, CLT for the state of the clutch pedal, and VCM for the suction pressure of the engine 1.

The flowchart of FIG. 9 shows the sequence of operation of the evaporator system when the ignition switch 15 is off. The operation of the evaporator system is explained with reference to FIGS. 1 and 9.

The evaporator system starts.

The running state of the engine 1 is detected by the revolution sensor 3. . . . (110)

A decision is made of whether the engine revolution speed is zero or not. If the engine revolution speed is zero, the system proceeds to the next processing (112). If not zero, it returns to the processing (110), i.e., the start processing. . . . (111)

A check is made of whether the filler switch 16 installed in the filler pipe 26 is on or off. That is, it is checked whether the filler gun 21 is inserted into the filler pipe 26 of the fuel tank 17 or whether the filler cap is removed. . . . (112)

If the filler switch 16 is on, the system proceeds to the next processing (114). If off, it returns to the start processing. . . . (113)

With the filler switch 16 turned on, the solenoid valves 8, 10 are energized open by a timer 12. At the same time the timer 12 is started. . . . (114)

While the timer 12 is on, the solenoid valves 8, 10 continue to be energized and stay open. When the timer 12 is turned off, the system proceeds to the next processing (116). . . . (115)

As the timer 12 is turned off, the current to the solenoid valves 8, 10 are cut off to close the valves. . . . (116)

Now, the operation of the evaporator system is terminated.

The flowchart of FIG. 10 shows the sequence of operation of the evaporator system when the ignition switch 15 is on. Referring to FIGS. 1 and 10, the operation of this evaporator system will be explained below.

The evaporator system starts.

The gear position of the speed change gear is detected by the gear position sensor 13. The signal from the gear position sensor 13 is sent to the electronic controller. . . . (120)

The vehicle speed is checked by the vehicle speed sensor 4 and the signal from the sensor 4 is sent to the electronic controller 11. . . . (121)

The clutch pedal switch 14 checks the on-off state of the clutch pedal. The on or off signal form the switch 14 is sent to the electronic controller 11. . . . (122)

The suction pressure of the engine is detected by the suction pressure sensor 2. The signal from the sensor 2 is sent to the electronic controller 11. . . . (123)

It is checked whether the signal from the gear position sensor 13 represents the fourth or fifth speed (in automatic transmission car, third or fourth speed). If the gear is in one of these speeds, the system proceeds to the next processing (125). If otherwise, the system returns to the start processing. . . . (124)

It is checked from the signal of the vehicle speed sensor 4 whether the car speed is higher than the specified speed α, say 50 km/h. If so, the system goes to the next processing (126). If the speed is lower than the specified value α, then the system returns to the start processing. . . . (125)

If it is decided from the clutch pedal switch that the clutch pedal is off, the system goes to the next processing (127). If on, the system returns to the start processing. . . . (126)

If is checked from the signal of the suction pressure sensor 2 whether the suction pressure of the engine 1 is lower than the specified pressure, say −100 mmHg. If the pressure is lower than the setting, the system proceeds to the next processing (128). If not, the system proceeds to the start processing. . . . (127)

The solenoid valves 9, 10 are energized to open. . . . (128)

The above sequence is repeated to purge the vapor fuel. In other words, a closed loop control is executed.

Performing the above control on the evaporator system opens the solenoid valves 8 and 10 during fuel filling and the solenoid valves 9 and 10 when the purge operation can be performed, and closes all of these solenoid valves 8, 9 and 10 in other cases.

When the above control is executed on these solenoid valves 8, 9 and 10, the evaporated fuel control system or evaporator system of this invention shown in FIG. 1 will work in the following manner.

First, the system operation when the fuel is supplied into the fuel tank 17 will be explained. When the filler cap or filler lid is opened to insert the filler gun 21 into the filler pipe 26, the electronic controller 11 opens the solenoid valves 8, 10 according to the signal from the filler switch 16. As a result, the evaporator line 19 is open communicating the canister 7 with the fuel tank 17. The evaporator line 19 has a larger inner diameter than the evaporator line 18 so that it has a smaller resistance to the gas flow. Similarly, the canister 7 has a smaller resistance to the gas flow than the canister 6. The canister 6 has the same structure as the conventional one and incorporates a valve control mechanism employing the diaphragm which, when the fuel is supplied with the engine stopped, opens the evaporator line 18 but closes the evaporator line 22 for purging. (In automobiles employing the carburetor, the line from the float bowl is also open.) When in this condition the fuel is supplied from the filler gun 21 into the fuel tank 17, the filler pipe 26 is sealed from the outer atmosphere because it has a sealing means or the check valve 23. Most of the vapor fuel in the fuel tank 17 moves through the evaporator line 19 into the canister 7 where it is removed of gasoline component as it passes through the active carbon that adsorbs the gasoline component. The clean gas filtered through the canister 7 now passes through the solenoid valve 10 to be discharged into the outer air. A small amount of vapor fuel that went to the canister 6 through the evaporator line 18 is removed of gasoline component as it passes through the active carbon in the canister 6 that adsorbs the gasoline component. The clean gas is then discharged through the drain of the canister 6. The inlet of the evaporator line 19 in the fuel tank 17 is provided with the rollover valve 24 which is designed to prevent the outflow of a large amount of fuel into the evaporator line 19 when the vehicle should be turned on its side in the accident with the engine 1 stopped and with the filler switch 16 operated undesirably to open the solenoid valves 8, 10. The roll over valve 24 also has a function of checking whether the fuel tank 17 is filled to its capacity during fuel filling.

Next, the system operation when the vapor fuel can be purged is explained below. The canister 7 adsorbs a large amount of gasoline and when the gasoline is purged from the canister by the conventional method that controls purging according only to the pressure difference and temperature of the carburetor, a large amount of vapor fuel or gasoline will flow into the carburetor causing a sharp change in the air-fuel ratio, which in turn may worsen the drivability. To prevent this, the evaporated fuel control system of this invention is so designed as to perform purging only when the engine operation is such that it can handle a large amount of vapor fuel purged from the canister. Generally such a vehicle operating condition is obtained when the vehicle is running at a relatively high speed with a stable small load. That is, it includes such cases as when the vehicle is running at the fourth or fifth speed (in the automatic transmission cars, at the third or fourth speed), when the vehicle speed is higher than 50 mph (80 km/h), when the car is running with the clutch completely engaged (this does not apply to the automatic transmission cars), and when the engine 1 is running at a relatively small load (i.e., the suction pressure is on the negative side beyond −200 mmHg).

The electronic controller 11 checks the signals from the gear position sensor 13, vehicle speed sensor 4, clutch pedal switch 14 and suction pressure sensor 2 to see if the above conditions are met. If any of the above conditions is met, the electronic controller 11 opens the solenoid valves 9 and 10. As a result, the fuel or gasoline held in the canister is purged into the carburetor 25 (or a common chamber depending on the type of the car) through the evaporator line 20 for combustion in the engine 1.

What is claimed is:

1. An evaporated fuel control system comprising:
an engine mounted on a vehicle;
a fuel tank mounted on the vehicle to supply fuel to the engine, the fuel tank having a fuel injection port to receive a filler gun for fuel supply and an exhaust port to discharge evaporated fuel in the tank;
a first evaporator line connected to the exhaust port of the fuel tank to introduce the evaporated fuel in the fuel tank into the engine;
a seal means provided to the fuel injection port to prevent the evaporated fuel from leaking out through the fuel injection port when the filler gun is inserted into the fuel injection port;
a filler switch to detect a filler gun insertion signal when the filler gun is inserted into the fuel injection port of the fuel tank;
a first canister disposed in the first evaporator line to temporarily hold and adsorb the evaporated fuel from the fuel tank;
a first solenoid valve provided in the first evaporator line between the fuel tank and the first canister;
a second solenoid valve provided in the first evaporator line between the first canister and the engine;
a third evaporator line to open the first canister into the open air through a filter, the filter being installed in the canister for adsorbing the vapor fuel;
a third solenoid valve provided in the third evaporator line;

a second evaporator line connected to the exhaust port of the fuel tank to introduce evaporated fuel in the fuel tank into the engine;

a second canister provided in the second evaporator line to temporarily hold and adsorb the evaporated fuel from the fuel tank, the second canister being communicated with the engine; and a control means to open the first solenoid valve, while the engine is stopped, to communicate the first canister with the fuel tank in response to the detection signal from the filler switch that detects when the filler gun is inserted into the fuel injection port and at the same time open the third solenoid valve to communicate the first canister to the open air through the filter, the control means also being adapted to open the second solenoid valve, while the engine is running, in response to the state that the evaporated fuel can be purged into the engine, to communicate the first canister with the engine, and at the same time open the third solenoid valve to communicate the first canister to the open air through the filter.

2. An evaporated fuel control system as set forth in claim 1, adapted and constructed wherein the vapor fuel in the first canister can be purged into the engine when the engine is running and when the intake negative pressure in the engine is lower than a specified value.

3. An evaporated fuel control system as set forth in claim 1, adapted an constructed wherein the vapor fuel in the first canister can be purged into the engine when the speed of the vehicle is higher than a specified value.

4. An evaporated fuel control system as set forth in claim 1, wherein the filter installed in the first canister consists of an annular case containing adsorbent that adsorbs the vapor fuel.

5. An evaporated fuel control system as set forth in claim 4, wherein the annular case that forms the filter in the first canister has its interior communicated with the first evaporator line and its exterior communicated with the third evaporator line.

* * * * *